US009037693B2

(12) United States Patent
Ibrahim

(10) Patent No.: US 9,037,693 B2
(45) Date of Patent: May 19, 2015

(54) LOCATING AND ADDRESSING COMMUNICATION DEVICES

(71) Applicant: The Boeing Company, Chicago, IL (US)

(72) Inventor: Yakentim Ibrahim, Brier, WA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 13/733,561

(22) Filed: Jan. 3, 2013

(65) Prior Publication Data
US 2014/0189078 A1 Jul. 3, 2014

(51) Int. Cl.
*G06F 15/177* (2006.01)
*H04L 12/24* (2006.01)
*H04L 29/12* (2006.01)
*H04L 12/26* (2006.01)

(52) U.S. Cl.
CPC ............ *H04L 41/12* (2013.01); *H04L 61/2038* (2013.01); *H04L 61/609* (2013.01); *H04L 43/10* (2013.01); *H04L 41/0803* (2013.01)

(58) Field of Classification Search
USPC ......................................... 709/221, 200, 223
See application file for complete search history.

(56) References Cited

U.S. PATENT DOCUMENTS

| 6,708,239 | B1 | 3/2004 | Ellerbrock et al. |
| 7,111,100 | B2 | 9/2006 | Ellerbrock |
| 7,319,854 | B2 | 1/2008 | vonDoenhoff et al. |
| 7,529,649 | B2 | 5/2009 | Lee et al. |
| 8,166,506 | B2 | 4/2012 | Callahan et al. |
| 8,245,969 | B2 | 8/2012 | Lee |
| 2003/0095520 | A1* | 5/2003 | Aalbers et al. ................. 370/338 |
| 2005/0273823 | A1 | 12/2005 | Brady, Jr. et al. |
| 2006/0246892 | A1 | 11/2006 | vonDoenhoff et al. |
| 2008/0186955 | A1* | 8/2008 | Puckett .......................... 370/352 |
| 2010/0042361 | A1 | 2/2010 | Hadley et al. |
| 2010/0289620 | A1 | 11/2010 | Aminger et al. |

OTHER PUBLICATIONS

European Search Report dated Apr. 11, 2014 for European Application No. 13 199 051.7, 6 pages.

* cited by examiner

*Primary Examiner* — El Hadji Sall
(74) *Attorney, Agent, or Firm* — Womble Carlyle Sandridge & Rice, LLP

(57) ABSTRACT

A system is provided that includes first- and second-network subsystems. The first-network subsystem includes a first-network device with knowledge of its physical location and assigned logical address within the first-network subsystem. The second-network subsystem includes a second-network device initially without knowledge of its physical location and assigned logical address within the second-network subsystem. The second-network device has a known spatial relationship with the first-network device. The first-network device is configured to communicate its physical location to the second-network device, which is configured to derive at least partially its physical location based on the physical location of the first-network device, and the known spatial relationship between the first- and second-network devices. The second-network device is further configured to receive an assignment of its logical address within the second-network subsystem using its derived physical location.

14 Claims, 5 Drawing Sheets

LOCATING AND ADDRESSING COMMUNICATION DEVICES

TECHNOLOGICAL FIELD

The present disclosure relates generally to communication devices and, in particular, to locating and/or logically-addressing communication devices in an environment such as an aircraft.

BACKGROUND

As systems, such as the multimedia entertainment, communications and diagnostic systems utilized in the transportation industry become more complex, a need arises for additional devices to communicate with one another or a more-central head-end. Historically, these systems included dedicated wiring extending between the various devices in order to support their communication. As systems have become more integrated and communication requirements have increased, the required amount of dedicated wiring has quickly become excessively large, both in terms of the space required for the wiring and the cost of the wiring and the attendant installation.

Many network systems have been developed to provide a common communications path between network devices and/or head-end. In transportation applications, for example, a network system may be utilized that includes network devices located throughout a vehicle to provide services to passengers for their benefit and convenience. In order for many of these network devices and other communication devices to effectively communicate, however, their physical locations and/or assigned logical addresses (e.g., IP address) need to be known. In an aircraft, for example, when a reading light button is pressed, the appropriate network system must know which light to activate; hence, it must know the light's physical location within the aircraft.

Therefore, it may be desirable to have an apparatus and method that takes into account at least some of the issues discussed above, as well as possibly other issues.

BRIEF SUMMARY

Example implementations of the present disclosure are generally directed to an improved system, communication device and methods. According to one aspect of example implementations, a system is provided that includes first-network and second-network subsystems. The first-network subsystem includes a first-network device with knowledge of its physical location and assigned logical address within the first-network subsystem. The second-network subsystem includes a second-network device initially without knowledge of its physical location and assigned logical address within the second-network subsystem. The second-network device has a known spatial relationship with the first-network device.

The first-network device is configured to communicate its physical location to the second-network device, such as over a point-to-point connection between the first- and second-network devices. The second-network device is configured to derive at least partially its physical location based on the physical location of the first-network device, and the known spatial relationship between the first- and second-network devices. The second-network device is further configured to receive an assignment of its logical address within the second-network subsystem using its derived physical location.

In one example, the second-network subsystem further includes a head-end configured to communicate a poll request including a physical location of a network device of the second-network subsystem. In this example, the second-network device may be configured to respond to the poll request in an instance in which the physical location in the poll request matches its derived physical location. The second-network device may thereby be assigned its logical address within the second network.

In one example, the system may further include a third-network subsystem including a third-network device initially without knowledge of its physical location and assigned logical address within the third-network subsystem. In this example, the third-network device may have a known spatial relationship with either or both the first- or second-network devices. Also in this example, the first- or second-network device may be configured to communicate its physical location to the third-network device. The third-network device may be configured to derive at least partially its physical location based on the physical location of the first- or second-network device, and the known spatial relationship between the first- or second-network device and the third-network device. And the third-network device may be further configured to receive an assignment of its logical address within the third-network subsystem using its derived physical location.

In one example, the system may further include a remote device outside of any network subsystem and initially without knowledge of its physical location. In this example, the remote device may have a known spatial relationship with either or both the first- or second-network devices. Also in this example, the first- or second-network device may be configured to communicate its physical location to the remote device. And the remote device may be configured to derive at least partially and store its physical location based on the physical location of the first- or second-network device, and the known spatial relationship between the first- or second-network device and the remote device.

In other aspects of example implementations, a communication device and methods are provided. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the present disclosure in general leans, reference will now be made to the accompanying drawings, which are not necessarily drawn to scale, and wherein:

DETAILED DESCRIPTION

Figure 1:
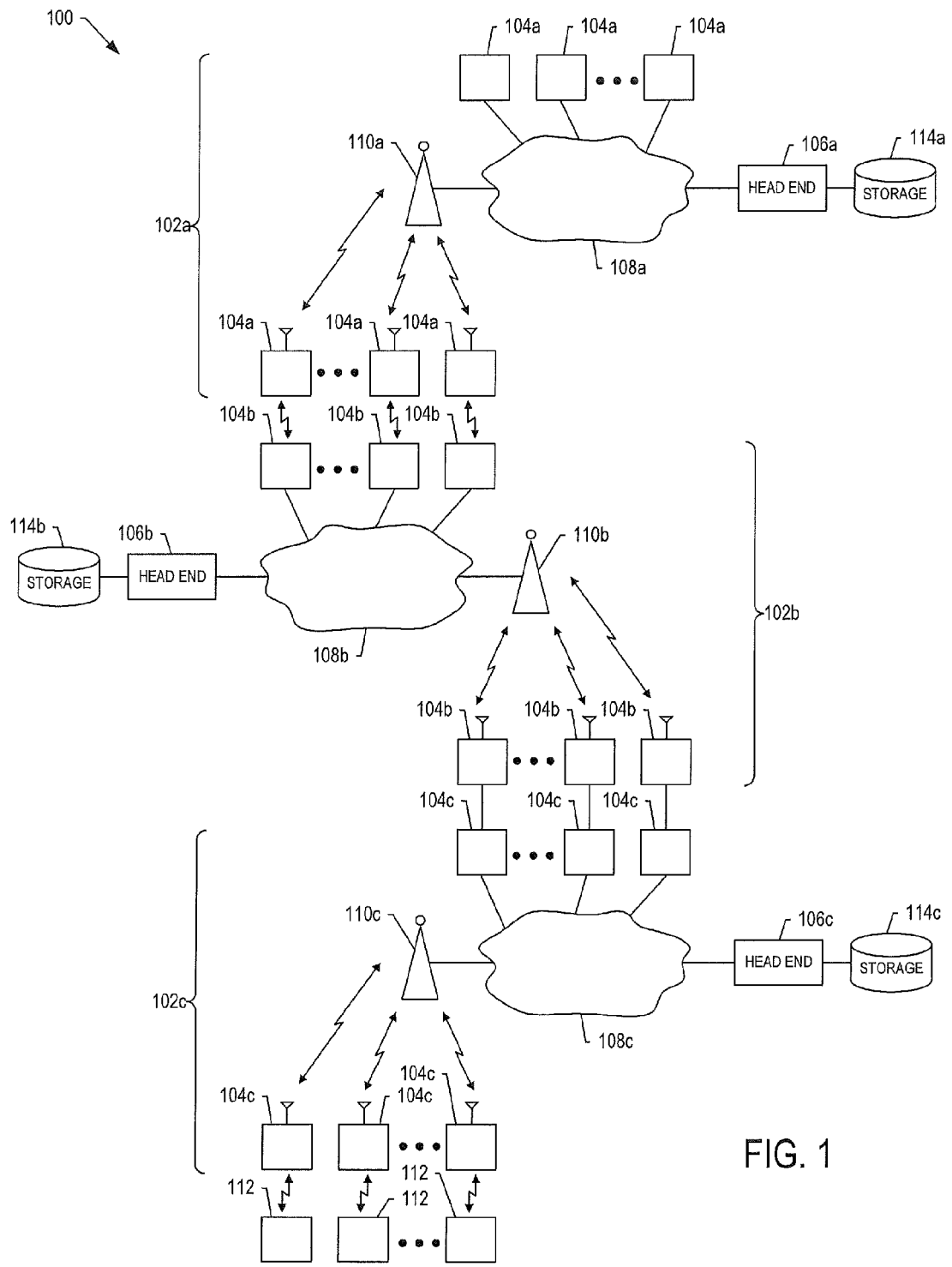
FIG. 1 is an illustration of a system in accordance with an example implementation.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

FIG. 1 illustrates a system 100 according to one example implementation of the present disclosure. As shown, the system may include any of a number of different subsystems (each an individual system) for performing one or more functions or operations. As shown, the system may include a number of subsystems 102 that employ network communication, three examples of such network subsystems 102a, 102b, 102c being shown (at times referred to as first-, second- and third-network subsystems). Each of the network subsystems may include a number of elements that may be generally referred to herein by respective callouts; or similar to their respective, illustrated network subsystems, the elements may be referred to as "first," "second" and "third," and by respective callouts with an additional "a," "b" or "c" designation. Although shown as part of the system, one or more of the network subsystems may instead be separate from but in communication with the system. It should also be understood that one or more of the network subsystems may function or operate as a separate system without regard to others of the network subsystems. And further, it should be understood that the system may include one or more additional or alternative subsystems than those shown in FIG. 1.

In FIG. 1, the system 100 is shown with example network configurations of elements of suitable network subsystems 102 of example implementations of the present disclosure. It should be understood, however, that the figure does not illustrate every element of every possible network subsystem, or every possible configuration of every possible network subsystem. As shown, each of the network subsystems may include a number of wired and/or wireless communication devices, such as one or more network devices 104, head-end 106 or the like, configured to communicate with one another directly and/or over a wired and/or wireless network 108 (e.g., backbone network). The network may generally include a collection of various different nodes, devices or functions that may be in communication with each other via corresponding wired and/or wireless interfaces. For example, the network may include one or more access points 110 each of which may serve as a point of access to one or more network devices and/or the head-end. In some examples, then, one or more network devices and/or the head-end may include an appropriate antenna for communicating with one another and/or an access point.

In various examples, the communication devices (e.g., network devices 104, head-end 106) may be configured to communicate within their network subsystem 102 according to logical addresses unique to the respective communication devices within the network subsystem. At least some of these communication devices may also be configured to communicate with communication devices of one or more other network subsystem(s), which may have their own logical addresses unique to the respective communication devices within their network subsystem(s). In some examples, the system 100 may further include other wired and/or wireless communication devices such as one or more remote devices 112 outside of the network subsystems but that may be configured to communicate with communication devices of one or more network subsystems. In one example, a communication device of one network subsystem may be configured to communicate with the communication device of another network subsystem or a remote device by a wired or wireless point-to-point connection between respective communication devices.

In various examples, the head-end 106 of a network subsystem 102 may provide configuration and control of the respective network subsystem. In this regard, the head-end may include or be in communication with an appropriate storage 114 (e.g., file storage, database storage, cloud storage) for configuration data for its respective network subsystem. The configuration data may include logical addresses assigned to respective communication devices (e.g., network devices 104, head-end 106) to enable their communication within the respective network subsystem. In one example, these logical addresses may be assigned during initial configuration of the network subsystem, at which time the communication devices may receive their logical address; or for other communication devices, their logical addresses may be assigned after initial configuration of the network subsystem.

For various ones of the network subsystems 102, the head-end 106 may be responsible for the assignment of logical addresses within the network subsystem, and may use some distinguishable aspect of the network devices 104 for assigning their logical addresses. In one example, this distinguishable aspect may be respective physical locations of the network devices. In this example, the configuration data in storage 114 may include such physical locations and assigned logical addresses, and a mapping therebetween. The head-end may use this configuration data to assign logical addresses to network devices based on their physical locations. In some examples, one or more of the network subsystems may use other schemes to assign logical addresses to the network devices. Examples of other suitable addressing schemes include serial, token line, manual, hardwire, pre-programming or the like.

The physical locations of network devices 104 may be represented in any of a number of different manners relative to a coordinate system of their environment. For example, a physical location may be described in terms of orthogonal X, Y coordinates for a two-dimensional (2D) Cartesian coordinate system, or in terms of orthogonal X, Y, Z coordinates for a three-dimensional (3D) Cartesian coordinate system. In another example, a physical location may be described in terms of polar coordinates for a polar coordinate system.

As suggested above and in the background section, in order for many network devices 104 and other communication devices such as remote devices 112 to effectively communicate, their physical locations and/or assigned logical addresses (e.g., IP address) need to be known. In some examples, however, one or more network devices and/or remote devices may not know their respective physical location(s) and/or logical address(es). Example implementations of the present disclosure therefore provide an apparatus and method for locating and/or logically-addressing communication devices such as network devices, remote devices or the like.

In accordance with example implementations, the first-network subsystem 102a may be configured for operation such that its first-network devices 104a may know (e.g., store) their respective physical locations and logical addresses, such as through their first head-end 106a and appropriate first storage 114a. In this network subsystem, any of a number of different schemes may be used to assign logical addresses to the network devices, such as any of the schemes identified above.

Unlike the first-network subsystem 102a, the second-network subsystem 102b may not yet be configured for operation. In this regard, the second storage 114b may store configuration data including physical locations and assigned logical addresses, and a mapping therebetween. But the second-network devices 104b may have unknown physical locations. And without the second-network devices knowing their physical locations, the second head-end 106b may not be able to communicate to them their assigned logical addresses.

One or more of the first-network devices 104a of the first-network subsystem 102a may be configured to communicate with one or more second-network devices 104b of the second-network subsystem 102b, such as by a wired or wireless point-to-point connection between respective communication devices. In this manner, the first-network device(s) may communicate with the second-network device(s) without requiring logical addresses of the second-network device(s). The first-network device(s) may communicate their respective physical location(s) to the second-network device(s), which may have a known spatial relationship with the first-network device(s). For example, a first-network device may be a known distance and direction from a second-network device. Additionally or alternatively, for example, a first-network device may be in one or more known orthogonal directions from a second-network device such that the two network devices share common X or Y coordinates (2D), or X, Y and/or Z coordinates (3D), at least one coordinate in the appropriate coordinate system differing for two network devices at different locations.

The second-network device(s) 104b may be configured to derive at least partially and store their respective physical location(s) based on the physical location(s) of the first-network device(s) 104a, and the known spatial relationship between first- and second-network device(s). In one example, the second-network device(s) may be configured to derive their complete physical location(s). In another example, the second-network device(s) may be configured to derive partial physical location(s), but which are sufficient to distinguish the second-network device(s) from one another. In a 2D/3D coordinate system, for example, in an instance in which the second-network devices have respective, distinguishable Y coordinates, the second-network device(s) may be configured to derive their Y coordinates without also deriving or otherwise knowing their X coordinate or (for 3D) their Z coordinate.

Once the second-network device(s) 104b have derived their respective physical location(s) (partially or completely), they may receive their complete physical location(s) and assigned logical addresses from the second head-end 106b. In one example, the second head-end may poll the second-network device(s) using their physical location(s) in storage 114b. The second-network device(s) may respond to a poll request from the second head-end in instance(s) in which the physical location(s) from the second head-end match their derived physical location(s). The second head-end may then accordingly communicate to the second-network device(s) their respective logical address(es). The second-network device(s) may record or otherwise store their respective logical address(es) (and perhaps even their physical location(s)) from the second head-end, and may thereby be configured for communication within the second-network subsystem 102b.

Similar to the second-network subsystem 102b, the third-network subsystem 102c may not yet be configured for operation at the time the first- and/or second-network subsystems 102a, 102b are configured for operation. The third storage 114c may store configuration data including physical locations and assigned logical addresses, and a mapping therebetween, but the third-network devices 104c may have unknown physical locations to enable the third head-end 106c to communicate to them their assigned logical addresses.

In this instance, one or more of the first-network devices 104a, and/or one or more of the second-network devices 104b, may be configured to communicate with one or more third-network devices 104c, such as by a wired or wireless point-to-point connection between respective communication devices without requiring logical addresses of the third-network device(s). The first- or second-network device(s) may communicate their respective physical location(s) to the third-network device(s), which may have a known spatial relationship with the first- or second-network device(s). In one example in which the second-network device(s) receive the first-network device's physical location(s), the second-network device(s) may instead communicate the first-network device's physical location(s) to the third-network device(s), which may have a known spatial relationship with the first-network device(s).

The third-network device(s) 104c may be configured to derive (partially or completely) and store their respective physical location(s) based on the physical location(s) of the first- or second-network device(s) 104a, 104b, and the known spatial relationship between first- or second- and third-network device(s). The third-network device(s) may then receive their complete physical location(s) and assigned logical addresses from the third head-end 106c. Similar to before, in one example, the third head-end may poll the third-network device(s) using their physical location(s) in storage 114c. The third-network device(s) may respond to a poll request from the third head-end in instance(s) in which the physical location(s) from the third head-end match their derived physical location(s). The third head-end may then accordingly communicate to the third-network device(s) their respective logical address(es). The third-network device(s) may record or otherwise store their respective logical address(es) (and perhaps even their physical location(s)) from the third head-end, and may thereby be configured for communication within the third-network subsystem 102c.

In one example, a similar process may be applied for one or more remote devices 112 outside of the network subsystems 102 but that may be configured to communicate with network devices 104 communication devices of one or more network subsystems. In this regard, one or more network devices of one or more of the network subsystems, such as one or more third-network devices 104c, may be configured to communicate with one or more remote devices, such as by a wired or wireless point-to-point connection between respective communication devices, again, without requiring logical addresses of the remote device(s). In this example, the third-network device(s) may communicate their respective physical location(s) to the remote device(s), which may have a known spatial relationship with the third-network device(s).

The remote device(s) 112 may be configured to derive (partially or completely) and store their respective physical location(s) based on the physical location(s) of the third-network device(s) 104c, and the known spatial relationship between the third-network device(s) and remote device(s). The remote device(s) may not require a logical address for communication within an appropriate subsystem 102, but it may nonetheless be desirable for them to know their physical location(s). The remote device(s) may thus record or otherwise store their respective, derived physical location(s).

As described above, a network device 104 may be configured to derive at least partially its respective physical location based on the physical location of another network device in another subsystem 102, and a known spatial relationship with the respective other network device. Similarly, a remote device 112 may be configured to derive at least partially its respective physical location based on the physical location of a network device, and a known spatial relationship with the respective network device. It should be understood, that a network/remote device may receive the physical location of multiple network devices with which the network/remote device has known spatial relationships. In these instances, the network/remote device may be configured to derive at least partially its respective physical location based on the physical locations of the respective multiple network devices, and known spatial relationships with the respective multiple network devices.

As may be seen from the above, network devices 104 of network subsystems 102 and/or remote devices 112 may be located and/or addressed in a hierarchy beginning with the first-network devices 104a. A second level of network devices/remote devices (e.g., second-network devices 104b) below the root first-network devices may then be located and/or addressed. Next, a third level of network devices/ remote devices (e.g., third-network devices 104c) below the first-level network devices may be located and/or addressed. Thereafter, a fourth level of network devices/remote devices (e.g., remote devices) below the third-level network devices may then be located and/or addressed. And so forth.

Figure 2:
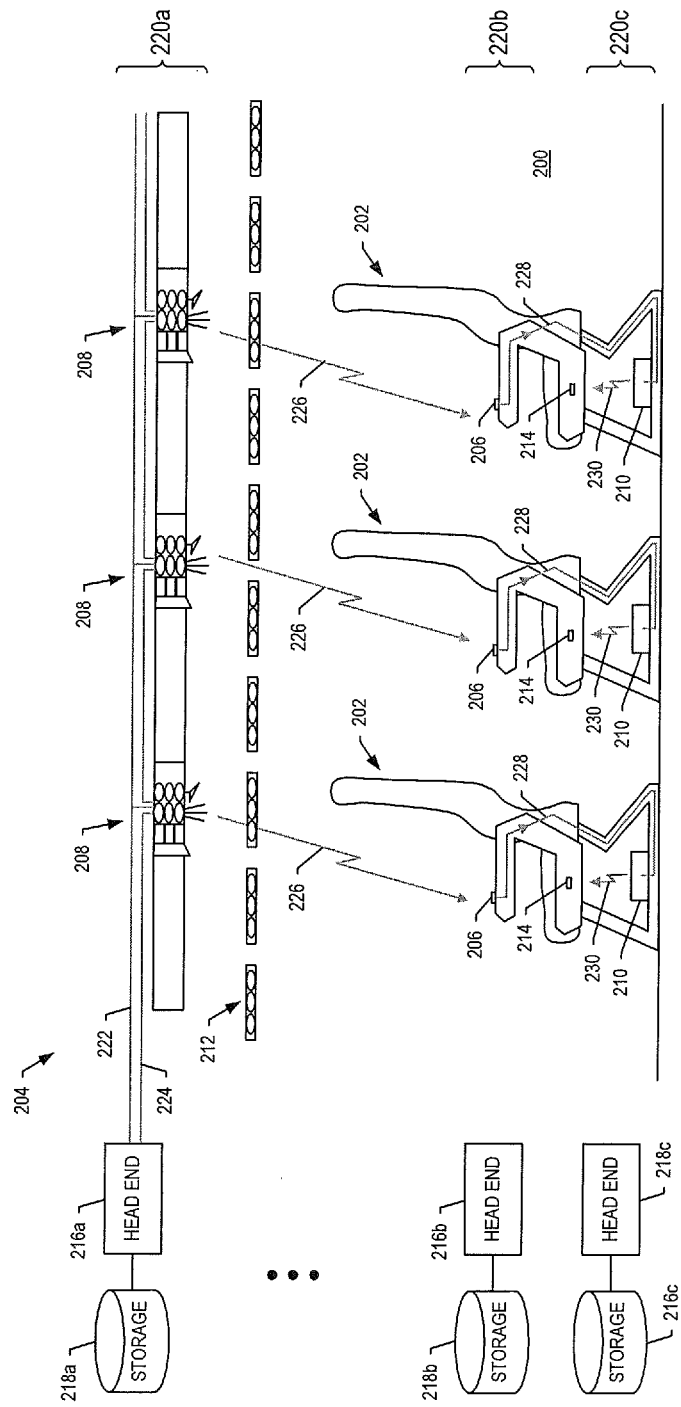
FIGS. 2 and 3 are illustrations of systems in the context of an aircraft including a portion of the cabin of the aircraft, in accordance with example implementations.

Example implementations of the present disclosure may find use in a variety of potential applications, particularly in the transportation industry, including for example, aerospace, marine and automotive applications. FIG. 2 illustrates a portion of the cabin 200 of an aircraft including a plurality of passenger seats 202 situated through the cabin. The aircraft also includes a cabin-services system 204, which in one example may correspond to the system 100 of FIG. 1. The cabin-services system may include a plurality of communication devices that may take a number of different configurations of network subsystems, with or without one or more remote devices. As shown, for example, the cabin-services system may include a number of passenger control units (PCUs) 206 and passenger service units (PSUs) 208. In one example, the PCUs may be installed anywhere on respective passenger seats (e.g., seat arm, seat back), and the PSUs may be installed above respective passenger seats or rows of seats). In one example, the PSUs may include respective sets of reading lights, personal-air outlets, flight attendant call lights and emergency oxygen (under control of appropriate circuitry).

As also shown, the cabin-services system 204 may include a number of in-flight entertainment systems 210 (seat electronics boxes), which in one example, may be installed below respective passenger seats 202 or rows of seats. The cabin-services system may include lights 212 configured to provide general cabin lighting. The cabin-services system may further include communication devices such as RFID tags 214 with which life vests may be equipped. As shown, these tags may be installed in respective life vests, which may in turn be installed relative to (e.g., underneath) respective seats. The cabin-services system may further include head-ends 216 and storage 218 with which communication devices of the cabin-services system may be configured in respective network subsystems, three of each being shown in FIG. 2.

As indicated above, the cabin-services system 204 may include communication devices such as PCUs 206, PSUs 208 (including, e.g., reading lights, personal-air outlets, flight attendant call lights), in-flight entertainment systems 210, cabin lights 212, RFID tags 214 and the like. As indicated above, the physical locations of these communication devices may be described in terms of orthogonal X, Y coordinates (2D), or in terms of orthogonal X, Y, Z coordinates (3D). In one example in the particular context of an aircraft, these coordinates may be referred to as the station line, butt line and water line. In this example, the station line may be the X axis, and may be positive pointing towards the aft part of the aircraft beginning somewhere before the nose of the fuselage. The butt line may be the Y axis of the aircraft, and may be positive pointing along the aircraft's left wing. The water line may be the Z axis of the aircraft, and may point upward.

Known spatial relationships may exist between various communication devices of the cabin-services system 204. In one example, these spatial relationships may be defined during specification and design of the aircraft. The interior design of a number of passenger vehicles such as aircraft may require adherence to numerous standards and rules. For example, in the United States, the Federal Aviation Administration (FAA) imposes restrictions on commercial airliners regarding the number of doors, distance between doors and seats 202 or other landmarks, and width of aisles. Additionally, customers or users of the passenger vehicles may submit their own requirements regarding distance between seats and other landmarks, in different classes of seating. In one example, the spatial relationships between various communication devices may be defined using a suitable interior configuration modeling system.

In one example, the cabin-services system 204 may be configured to include a plurality of network subsystems 220, such as a first-network subsystem 220a with the PSUs 208 (e.g., first-network devices 104a), a second-network subsystem 220b with the PCUs 206 (e.g., second-network devices 104b) and a third-network subsystem 220c with the in-flight entertainment systems 210 (e.g., third-network devices 104c). The first-, second- and third-network subsystems may further include respective ones of a first head-end 216a and storage 218a, second head-end 216b and storage 218b, and third head-end 216c and storage 218c. Also in this example, the RFID tags 214 may be treated as remote devices (e.g., devices 112).

As shown, the PSUs 208 and first head-end 216a may be connected by a network including a network bus 222 and token line 224. In one example, the PSUs may be addressed using the token line. In this regard, the first head-end may pass a token to on to a first wired PSU, and configure its logical address. After the first PSU is addressed, the first PSU may pass the token to the next PSU, at which point the first head-end may configure its logical address. This may continue through all of the PSUs of the first-network subsystem 220a, after which the first head-end and PSUs may communicate with one another using their logical addresses. The head-end may at this point also pass to the PSUs their respective physical locations.

One or more of the PSUs 208 of the first-network subsystem 220a may be configured to communicate with one or more PCUs 206 of the second-network subsystem 220b. In one example, this may be by a wireless point-to-point connection such as visible-light communication 226. Through this connection, the PSU(s) may communicate their respective physical location(s) to the PCU(s), which may have a known spatial relationship with the PSU(s). The PCU(s) may be configured to derive at least partially and store their respective physical location(s) (partial or complete) based on the physical location(s) of the PSU(s), and the known spatial relationship between PSU(s) and PCU(s). The PCU(s) may then receive their complete physical location(s) and assigned logical addresses from the second head-end 216b (in storage 218b), such as through an appropriate polling of the PCU(s). The PCU(s) may record or otherwise store their respective logical address(es) from the second head-end, and may thereby be configured for communication within the second-network subsystem 220b.

As also shown, one or more of the PCUs 206 may be configured to communicate with one or more in-flight entertainment systems 210. This may be accomplished by a wired point-to-point connection, such as by an appropriate wire 228, cable, bus or the like. The PCU(s) may communicate their respective physical location(s) to the in-flight entertainment system(s), which may have a known spatial relationship with the PCU(s). The in-flight entertainment system(s) may be configured to derive (partially or completely) and store their respective physical location(s) based on the physical location(s) of the PCU(s), and the known spatial relationship between PCU(s) and in-flight entertainment system(s). The in-flight entertainment system(s) may then receive their complete physical location(s) and assigned logical addresses from the third head-end 216c (in storage 218c), such as through an appropriate polling of the in-flight entertainment system(s). The in-flight entertainment system(s) may record or otherwise store their respective logical address(es) from the third head-end, and may thereby be configured for communication within the third-network subsystem 220c.

In one example, one or more in-flight entertainment systems 210 may be configured to communicate with one or more RFID tags 214. This may be accomplished by a wireless point-to-point connection such as near-field communication 230. The in-flight entertainment system(s) may communicate their respective physical location(s) to the RFID tag(s), which may have a known spatial relationship with the in-flight entertainment system(s). The RFID tag(s) may be configured to derive (partially or completely) their respective physical location(s) based on the physical location(s) of the in-flight entertainment system(s), and the known spatial relationship between the in-flight entertainment system(s) and RFID tag(s). It may be desirable for the RFID tag(s) to know their physical location(s) such as to track installation locations of respective life vest(s). The RFID tag(s) may thus record or otherwise store their respective, derived physical location(s).

Figure 3:
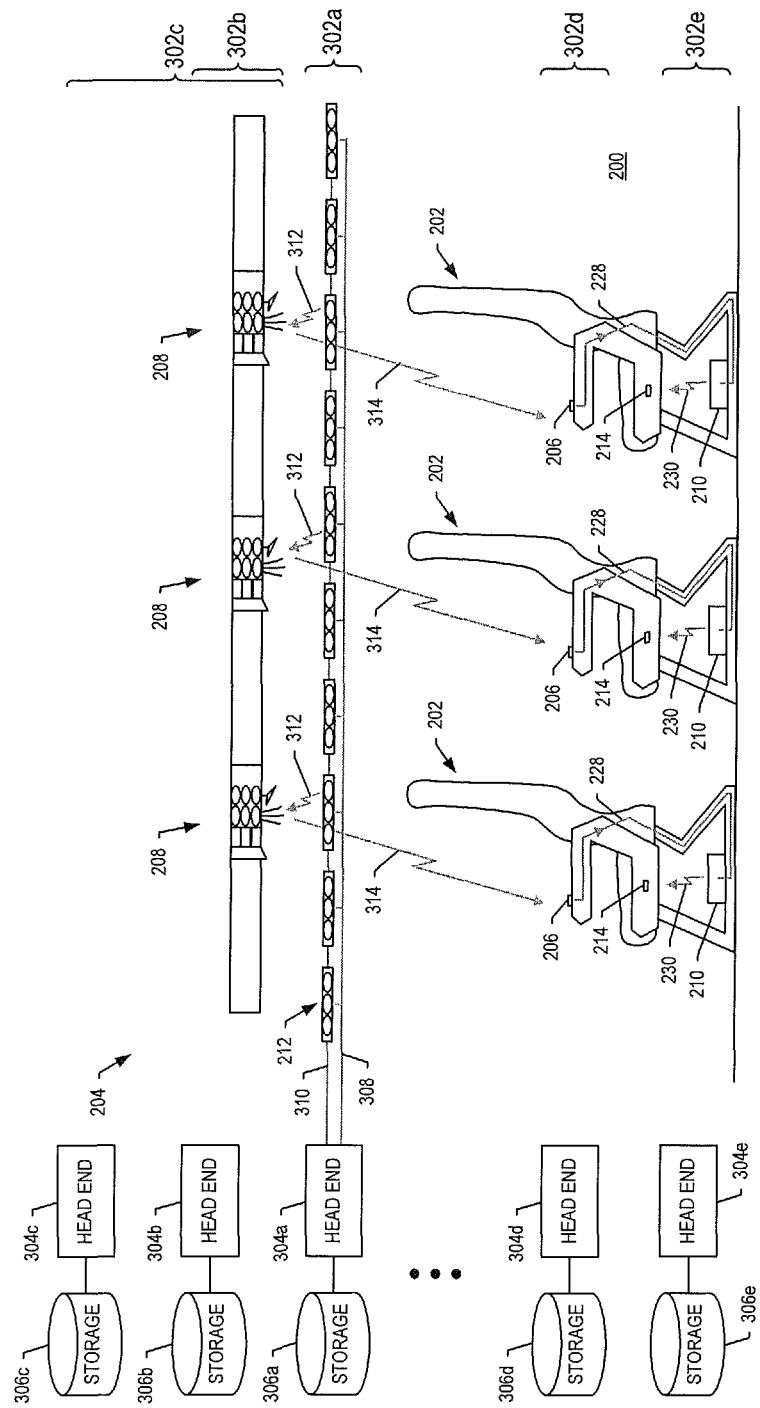

FIG. 3 illustrates another example configuration of the cabin-services system 204 to include a plurality of network subsystems 300. In this example, the cabin-services system include a plurality of network subsystems 302, such as a first-network subsystem 302a with the general cabin lights 212, second- and third-network subsystems 302b, 302c with respective ones of the reading lights and oxygen-deployment circuitry of the PSUs 208, fourth-network subsystem 302d with the PCUs 206 and a fifth-network subsystem 302e with the in-flight entertainment systems 210. The first-, second-, third-, fourth- and fifth-network subsystems may further include respective ones of a first head-end 304a and storage 306a, second head-end 304b and storage 306b, third head-end 304c and storage 306c, fourth head-end 304d and storage 306d, and fifth head-end 304e and storage 306e. Similar to before, the RFID tags 214 may be treated as remote devices.

As shown, the general cabin lights 212 and first head-end 304a may be connected by a network including an optical network bus 308 and token line 310. In one example, the general cabin lights may be addressed using the token line. In this regard, the first head-end may pass a token to on to a first optically-wired general cabin light unit, and configure its logical address. After the first general cabin light unit is addressed, the first general cabin light unit may pass the token to the next general cabin light unit, at which point the first head-end may configure its logical address. This may continue through all of the general cabin light units of the first-network subsystem 302a, after which the first head-end and general cabin lights may communicate with one another using their logical addresses. The head-end may at this point also pass to the general cabin lights their respective physical locations.

One or more of the general cabin light units 212 of the first-network subsystem 302a may be configured to communicate with one or more reading light units (of PSUs 208) of the second-network subsystem 302b, and one or more oxygen-deployment circuitry of the third-network subsystem 302c. In one example, this may be by a wireless point-to-point connection such as visible-light communication 312. Through this connection, the general cabin light unit(s) may communicate their respective physical location(s) to the reading light unit(s) and oxygen-deployment circuitry, which may have known spatial relationships with the general cabin light unit(s). The reading light unit(s) and oxygen-deployment circuitry may be configured to derive at least partially and store their respective physical location(s) (partial or complete) based on the physical location(s) of the general cabin light unit(s), and the known spatial relationships between general cabin light unit(s) and respective ones of the reading light unit(s) and oxygen-deployment circuitry. The reading light unit(s) and oxygen-deployment circuitry may then receive their complete physical location(s) and assigned logical addresses from respective ones of the second head-end 304b (in storage 306b), and third head-end 304c (in storage 306c), such as through appropriate polling similar to that described above. The reading light unit(s) and oxygen-deployment circuitry may record or otherwise store their respective logical address(es) from respective ones of the second head-end and third head-end, and may thereby be configured for communication within respective ones of the second-network subsystem 302b and third-network subsystem 302c.

One or more of the reading light unit(s) (of PSUs 208) of the second-network subsystem 302b may be configured to communicate with one or more PCUs 206 of the fourth-network subsystem 302d. In one example, this may be by a wireless point-to-point connection such as visible-light communication 314. Through this connection, the reading light unit(s) may communicate their respective physical location(s) to the PCU(s), which may have a known spatial relationship with the reading light unit(s). The PCU(s) may be configured to derive at least partially and store their respective physical location(s) (partial or complete) based on the physical location(s) of the reading light unit(s), and the known spatial relationship between reading light unit(s) and PCU(s). The PCU(s) may then receive their complete physical location(s) and assigned logical addresses from the fourth head-end 304d (in storage 306d), such as through an appropriate polling of the PCU(s). The PCU(s) may record or otherwise store their respective logical address(es) from the fourth head-end, and may thereby be configured for communication within the fourth-network subsystem 302d.

Similar to the example of FIG. 2, in the example of FIG. 3, one or more of the PCUs 206 may be configured to communicate with one or more in-flight entertainment systems 210 such as by an appropriate wire 228, cable, bus or the like. The PCU(s) may communicate their respective physical location(s) to the in-flight entertainment system(s), which may derive (partially or completely) and store their respective physical location(s) based on the respective physical location(s) and known spatial relationship between PCU(s) and in-flight entertainment system(s). The in-flight entertainment system(s) may then receive their complete physical location(s) and assigned logical addresses from the fifth head-end 304e (in storage 306e), such as through an appropriate polling. The in-flight entertainment system(s) may record or otherwise store their respective logical address(es) from the fifth head-end, and may thereby be configured for communication within the fifth-network subsystem 302e.

Also similar to the example of FIG. 2, in the example of FIG. 3, one or more in-flight entertainment systems 210 may be configured to communicate with one or more RFID tags 214 such as through near-field communication 230. The in-flight entertainment system(s) may communicate their respective physical location(s) to the RFID tag(s), which may derive (partially or completely) and store their respective physical location(s) based on the respective physical location(s) and known spatial relationship between the in-flight entertainment system(s) and RFID tag(s). Again, this may enable the RFID tag(s) to know their physical location(s).

Figure 4:
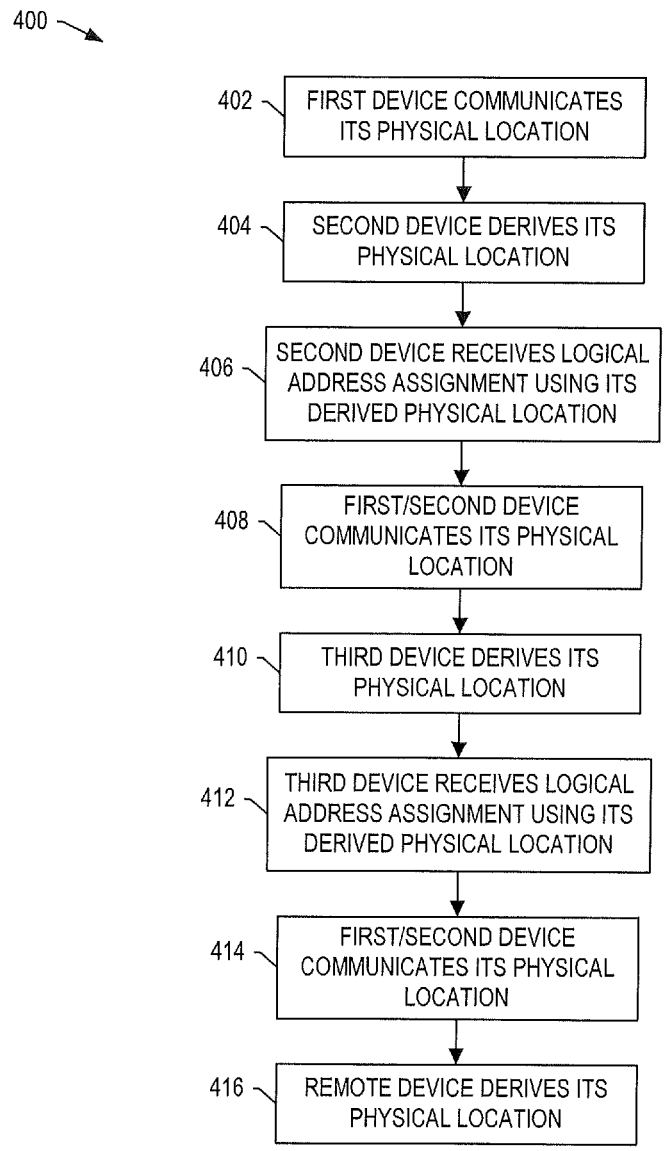
FIG. 4 is a flow diagram illustrating various operations in a method according to one example implementation.

FIG. 4 illustrates various operations in a method 400 of communicating within a system 100 according to one example implementation. As described above, the system may include a first-network subsystem 102a including a first-network device 104a with knowledge of its physical location and assigned logical address within the first-network subsystem. The system may include a second-network subsystem 102b including a second-network device 104b initially without knowledge of its physical location and assigned logical address within the second-network subsystem. The second-network device may have a known spatial relationship with the first-network device.

As shown at block 402, the method may include the first-network device communicating its physical location to the second-network device, such as over a point-to-point connection between the first- and second-network devices. As shown at block 404, the method may include the second-network device deriving at least partially its physical location based on the physical location of the first-network device, and the known spatial relationship between the first- and second-network devices. And as shown at block 406, the method may include the second-network device receiving an assignment of its logical address within the second-network subsystem using its derived physical location.

In one example, the system may further include a third-network subsystem 102c including a third-network device 104c initially without knowledge of its physical location and assigned logical address within the third-network subsystem. The third-network device may have a known spatial relationship with either or both the first- or second-network devices 104a, 104b. In this example, as shown at block 408, the method may include the first- or second-network device communicating its physical location to the third-network device. The method may include the third-network device deriving at least partially its physical location based on the physical location of the first- or second-network device, and the known spatial relationship between the first- or second-network device and the third-network device, as shown at block 410. And the method may include the third-network device receiving an assignment of its logical address within the third-network subsystem using its derived physical location, as shown at block 412.

In one example, the system may further include a remote device 112 outside of any network subsystem and initially without knowledge of its physical location. The remote device may have a known spatial relationship with either or both the first- or second-network devices 104a, 104b. In this example, as shown at block 414, the method may include the first- or second-network device communicating its physical location to the remote device. Then, as shown at block 416, the method may include the remote device deriving at least partially and storing its physical location based on the physical location of the first- or second-network device, and the known spatial relationship between the first- or second-network device and the remote device.

According to example implementations of the present disclosure, the system 100 and its network subsystems 102 including their network devices 104, head-ends 106, networks 108, access points 110 and storage 114, and including remote devices 112, may be implemented by various means. Means for implementing the systems, subsystems and their respective elements may include hardware, alone or under direction of one or more computer program code instructions, program instructions or executable computer-readable program code instructions from a computer-readable storage medium. In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wired or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 5:
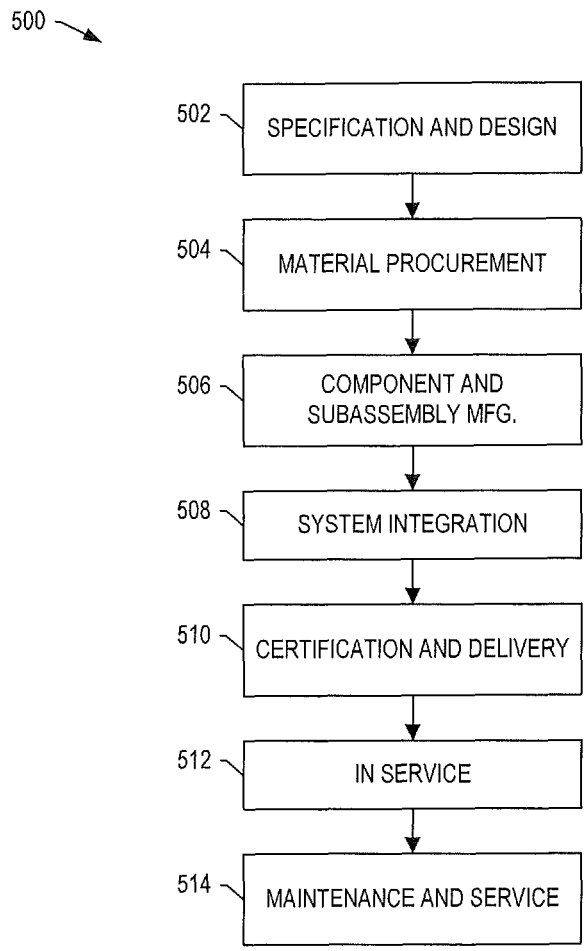
FIG. 5 is a flow diagram of an example aircraft production and service methodology, according to one example implementation.
Figure 6:
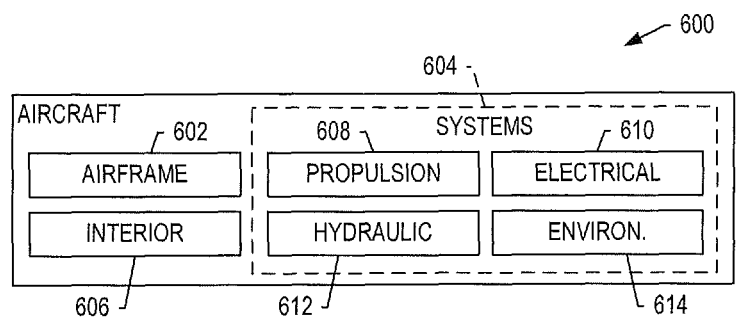
FIG. 6 is a block diagram of an example aircraft, according to one example implementation.

As explained above, implementations of the present disclosure may find use in a variety of potential applications, particularly in the transportation industry. Thus, referring now to FIGS. 5 and 6, example implementations may be used in the context of an aircraft manufacturing and service method 500 as shown in FIG. 5, and an aircraft 600 as shown in FIG. 6. During pre-production, example method may include specification and design 502 of the aircraft and material procurement 504. The disclosed system and method may be used in the design of network subsystems for installation onboard the aircraft. During production, component and subassembly manufacturing 506 and system integration 508 of the aircraft takes place. Thereafter, the aircraft may go through certification and delivery 510 in order to be placed in service 512. While in service by a customer, the aircraft is scheduled for routine maintenance and service 514 (which may also include modification, reconfiguration, refurbishment, and so on). The disclosed system and method may also be used during production and/or service of the aircraft, and may be used onboard the aircraft being produced.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization and so on.

As shown in FIG. 6, the aircraft 600 produced by example method 500 may include an airframe 602 with a plurality of systems 604 and an interior 606 including a cabin, for example. Examples of high-level systems may include one or more of a propulsion system 608, an electrical system 610, a hydraulic system 612 or an environmental system 614. Any number of other systems may be included, including any of the aforementioned network subsystems. Although an aerospace example is shown, the principles of the present disclosure may be applied to other industries, such as the automotive industry.

As suggested above, the system and method embodied herein may be employed during any one or more of the stages of the production and service method 500. For example, components or subassemblies corresponding to production process 506 may be fabricated or manufactured in a manner similar to components or subassemblies produced while the aircraft 600 is in service. Also, one or more system implementations, apparatus implementations, method implementations or a combination thereof may be utilized during the production stages 506 and 508, for example, by substantially expediting assembly of or reducing the cost of an aircraft. Similarly, one or more of apparatus implementations, method implementations or a combination thereof may be utilized while the aircraft is in service, for example and without limitation, to maintenance and service 514.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
a first-network subsystem including a first-network device with knowledge of its physical location and assigned logical address within the first-network subsystem; and
a second-network subsystem including a second-network device initially without knowledge of its physical location and assigned logical address within the second-network subsystem, the second-network device having a known spatial relationship with the first-network device, wherein the first-network device is configured to communicate its physical location to the second-network device,
wherein the second-network device is configured to derive at least partially its physical location based on the physical location of the first-network device, and the known spatial relationship between the first- and second-network devices, the second-network device being further configured to receive an assignment of its logical address within the second-network subsystem using its derived physical location,
wherein the second-network subsystem further includes a head-end configured to communicate a poll request including a physical location of a network device of the second network subsystem, and
wherein the second-network device is configured to respond to the poll request in an instance in which the physical location in the poll request matches its derived physical location, the second-network device thereby being assigned its logical address within the second network.

2. The system of claim 1, wherein the first-network device is configured to communicate its physical location over a point-to-point connection between the first- and second-network devices.

3. The system of claim 1 further comprising:
a third-network subsystem including a third-network device initially without knowledge of its physical location and assigned logical address within the third-network subsystem, the third-network device having a known spatial relationship with either or both the first- or second network devices,
wherein the first- or second-network device is configured to communicate its physical location to the third-network device, and
wherein the third-network device is configured to derive at least partially its physical location based on the physical location of the first- or second-network device, and the known spatial relationship between the first- or second-network device and the third-network device, the third-network device being further configured to receive an assignment of its logical address within the third-network subsystem using its derived physical location.

4. The system of claim 1 further comprising:
a remote device outside of any network subsystem and initially without knowledge of its physical location, the remote device having a known spatial relationship with either or both the first- or second-network devices,
wherein the first- or second-network device is configured to communicate its physical location to the remote device, and
wherein the remote device is configured to derive at least partially and store its physical location based on the physical location of the first- or second-network device, and the known spatial relationship between the first- or second-network device and the remote device.

5. A communication device comprising a processor and a memory storing computer-readable program code portions that, in response to execution by the processor, cause the communication device to at least:
receive a physical location of a network device of a network subsystem, the communication device being outside the network subsystem and having a known spatial relationship with the network device, the communication device being a second-network device of a second-network subsystem, or a remote device outside of any network subsystem;
derive at least partially its physical location based on the physical location of the network device, and the known spatial relationship between the communication device and network device; and
store its derived physical location,
wherein the communication device is the second-network device of the second-network subsystem in which its logical address is initially unknown thereto, and wherein the memory stores further computer-readable program code portions that, in response to execution by the processor, cause the communication device to further:
receive an assignment of its logical address within the second-network subsystem using its derived physical location, the communication device thereby being enabled to communicate within the second-network subsystem using its logical address, and
wherein the communication device being caused to receive the assignment of its logical address within the second-network subsystem includes being caused to:
receive a poll request from a head-end including a physical location of a network device of the second-network subsystem; and
respond to the poll request in an instance in which the physical location in the poll request matches its derived physical location.

6. The communication device of claim 5, wherein the communication device is caused to receive the physical location of the network device over a point-to-point connection between the communication device and network device.

7. The communication device of claim 5, wherein the memory stores further computer-readable program code portions that, in response to execution by the processor, cause the communication device to further:

communicate its derived physical location to a third-network device of a third-network subsystem, or the same or another remote device outside of any network subsystem.

8. A method of communicating within a system comprising a first-network subsystem including a first-network device with knowledge of its physical location and assigned logical address within the first-network subsystem, and a second-network subsystem including a second-network device initially without knowledge of its physical location and assigned logical address within the second-network subsystem, the second-network device having a known spatial relationship with the first-network device, the method comprising:

the first-network device communicating its physical location to the second-network device;

the second-network device deriving at least partially its physical location based on the physical location of the first-network device, and the known spatial relationship between the first- and second-network devices; and the second-network device receiving an assignment of its logical address within the second-network subsystem using its derived physical location, wherein the second-network subsystem further includes a head-end, and wherein the method further comprises:

the head-end communicating a poll request including a physical location of a network device of the second-network subsystem; and the second-network device responding to the poll request in an instance in which the physical location in the poll request matches its derived physical location, the second-network device thereby being assigned its logical address within the second network.

9. The method of claim 8, wherein the first-network device communicates its physical location over a point-to-point connection between the first- and second-network devices.

10. The method of claim 8, wherein the system further comprises a third network subsystem including a third-network device initially without knowledge of its physical location and assigned logical address within the third-network subsystem, the third-network device having a known spatial relationship with either or both the first- or second-network devices, and wherein the method further comprises:

the first- or second-network device communicating its physical location to the third network device;

the third-network device deriving at least partially its physical location based on the physical location of the first- or second-network device, and the known spatial relationship between the first- or second-network device and the third-network device; and the third-network device receiving an assignment of its logical address within the third network subsystem using its derived physical location.

11. The method of claim 8, wherein the system further comprises a remote device outside of any network subsystem and initially without knowledge of its physical location, the remote device having a known spatial relationship with either or both the first- or second-network devices, and wherein the method further comprises:

the first- or second-network device communicating its physical location to the remote device; and the remote device deriving at least partially and storing its physical location based on the physical location of the first- or second-network device, and the known spatial relationship between the first- or second-network device and the remote device.

12. A method comprising:

a communication device receiving a physical location of a network device of a network subsystem, the communication device being outside the network subsystem and having a known spatial relationship with the network device, the communication device being a second-network device of a second-network subsystem, or a remote device outside of any network subsystem;

the communication device deriving at least partially its physical location based on the physical location of the network device, and the known spatial relationship between the communication device and network device; and the communication device storing its derived physical location, wherein the communication device is the second-network device of the second-network subsystem in which its logical address is initially unknown thereto, and wherein the method further comprises:

the communication device receiving an assignment of its logical address within the second-network subsystem using its derived physical location, the communication device thereby being enabled to communicate within the second-network subsystem using its logical address, and wherein the communication device receiving the assignment of its logical address within the second-network subsystem includes:

the communication device receiving a poll request from a head-end including a physical location of a network device of the second-network subsystem; and the communication device responding to the poll request in an instance in which the physical location in the poll request matches its derived physical location.

13. The method of claim 12, wherein the communication device receives the physical location of the network device over a point-to-point connection between the communication device and network device.

14. The method of claim 12 further comprising:

the communication device communicating its derived physical location to a third-network device of a third-network subsystem, or the same or another remote device outside of any network subsystem.

* * * * *